(12) United States Patent
Zoller et al.

(10) Patent No.: US 10,017,924 B2
(45) Date of Patent: Jul. 10, 2018

(54) SANITARY INSTALLATION ELEMENT

(75) Inventors: Uwe Zoller, Auggen (DE); Christoph Weis, Mullheim (DE); Hermann Grether, Mullheim (DE)

(73) Assignee: NEOPERL GMBH, Mullheim (DE)

( * ) Notice: Subject to any disclaimer, the term of this patent is extended or adjusted under 35 U.S.C. 154(b) by 1359 days.

(21) Appl. No.: 12/516,422

(22) PCT Filed: Nov. 29, 2007

(86) PCT No.: PCT/EP2007/010366
§ 371 (c)(1),
(2), (4) Date: May 27, 2009

(87) PCT Pub. No.: WO2008/067948
PCT Pub. Date: Jun. 12, 2008

(65) Prior Publication Data
US 2010/0025499 A1 Feb. 4, 2010

(30) Foreign Application Priority Data

Dec. 6, 2006 (DE) .................. 10 2006 057 795
Dec. 6, 2006 (DE) .................. 20 2006 018 577 U
(Continued)

(51) Int. Cl.
*E03C 1/084* (2006.01)
*G05D 7/01* (2006.01)
*E03C 1/02* (2006.01)

(52) U.S. Cl.
CPC ........ *E03C 1/084* (2013.01); *E03C 2001/026* (2013.01); *G05D 7/012* (2013.01)

(58) Field of Classification Search
CPC .... E03C 1/084; E03C 2001/026; G05D 7/012
(Continued)

(56) References Cited

U.S. PATENT DOCUMENTS 2,014,063 A 9/1935 Brady
2,770,497 A * 11/1956 Filliung et al. ............... 239/109
(Continued)

FOREIGN PATENT DOCUMENTS

AT 258063 11/1967
DE 2658742 7/1978
(Continued)

Primary Examiner — Jason Boeckmann
(74) Attorney, Agent, or Firm — Volpe and Koenig, P.C.

(57) ABSTRACT

The invention relates to a sanitary installation element (101) which is arranged in a water line. The installation element (101) according to the invention comprises a mixing device (4) with at least one throttling or closing element (5), which throttling or closing element (5) can be moved under the pressure of the inflowing water from a mixing or open position into a throttling or closed position against a restoring force, wherein the mixing device (4) offers a relatively large clear flow cross section when the at least one throttling or closing element (5) in the mixing or open position, and, by contrast thereto, a reduced clear flow cross section when the at least one throttling or closing element (5) is in the throttling or closed position. The installation element according to the invention is distinguished in that it always offers an optimum flow cross section both in low and high pressure ranges.

14 Claims, 16 Drawing Sheets

(30) Foreign Application Priority Data

Mar. 2, 2007 (DE) ........................ 10 2007 010 618
Mar. 2, 2007 (DE) ..................... 20 2007 003 264 U

(58) Field of Classification Search
USPC ......... 239/428.5, 418, 419, 419.5, 421, 429, 239/432, 461, 462, 500, 504, 518, 520, 239/533, 533.3, 553.5, 590, 590.5, 590.3, 239/600, 575, 570; 137/504; 138/40, 41
See application file for complete search history.

(56) References Cited

U.S. PATENT DOCUMENTS

| | | | |
|---|---|---|---|
| 3,334,818 A * | 8/1967 | Moen | ........................ 239/428.5 |
| 3,409,050 A * | 11/1968 | Weese | ............................. 138/45 |
| 3,847,178 A | 11/1974 | Keppel | |
| 4,000,857 A | 1/1977 | Moen | |
| 4,313,564 A * | 2/1982 | Shames et al. | ............... 239/110 |
| 4,344,459 A * | 8/1982 | Nelson | ............................ 138/45 |
| 4,437,493 A | 3/1984 | Okuda et al. | |
| 4,470,546 A * | 9/1984 | Wildfang | ................... 239/428.5 |
| 4,534,513 A * | 8/1985 | Aghnides | ................... 239/428.5 |
| 4,562,960 A | 1/1986 | Marty et al. | |
| 5,071,071 A * | 12/1991 | Chao | ........................... 239/428.5 |
| 5,348,231 A * | 9/1994 | Arnold et al. | ............. 239/428.5 |
| 5,467,929 A * | 11/1995 | Bosio | ......................... 239/428.5 |
| 5,769,326 A | 6/1998 | Muchenberger et al. | |
| 6,513,731 B2 * | 2/2003 | Griffin et al. | ................. 239/394 |
| 7,549,519 B2 * | 6/2009 | Atwater et al. | ............... 188/381 |
| 8,308,079 B2 | 11/2012 | Grether | |
| 8,402,995 B2 | 3/2013 | Zoller | |
| 2003/0034364 A1 * | 2/2003 | Mugge | ........................ 222/518 |
| 2006/0011748 A1 | 1/2006 | Ferrari | |
| 2006/144962 A1 | 7/2006 | Zoller | |
| 2009/0020628 A1 * | 1/2009 | Belisle | ........................ 239/428.5 |

FOREIGN PATENT DOCUMENTS

| | | |
|---|---|---|
| DE | 20304659 U1 | 7/2004 |
| GB | 1603982 A | 12/1981 |

* cited by examiner

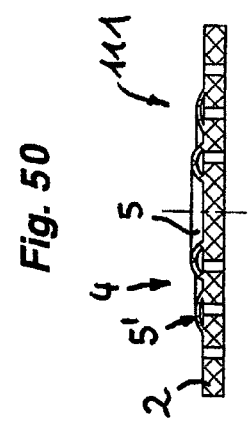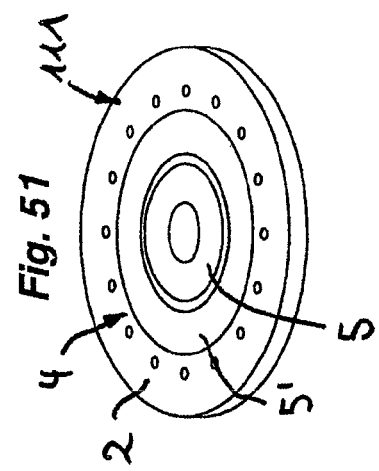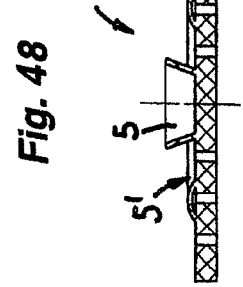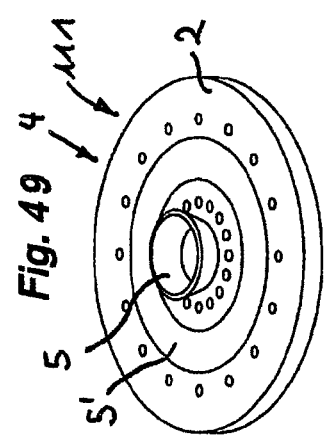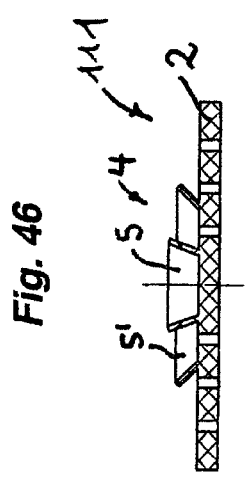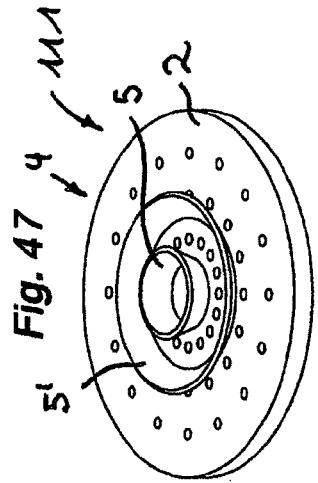

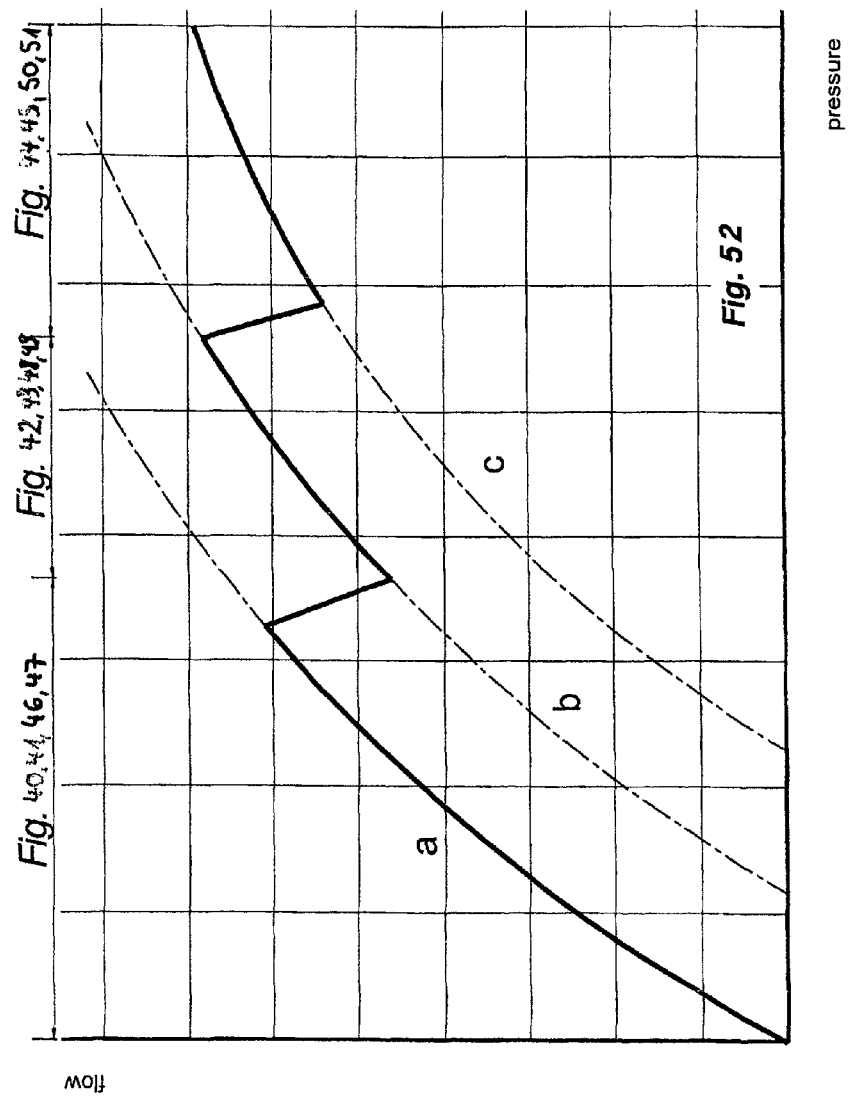

SANITARY INSTALLATION ELEMENT

BACKGROUND

The invention relates to a sanitary installation element which is arranged in a water line.

Sanitary installation elements which are arranged in a water line are already known in an extremely wide variety of embodiments. For example, jet regulators have already been created which can be inserted into the water outlet of a sanitary outlet fitting. The previously known jet regulators, which are either fastened directly in the water outlet of a sanitary outlet fitting or can be inserted into an outlet mouthpiece which can be mounted on the water outlet, often have a jet splitter which divides the water flow flowing in through the pipe line and the fitting body into a multiplicity of individual jets. Said individual jets may, depending on the jet regulator design, be aerated if required before a homogeneous, soft and non-sputtering water jet is formed at the water outlet in a homogenization device which is situated downstream of the jet splitter and/or in an outflow-side flow straightener, which has a network-like, grate-like, sieve-like or honeycomb-like structure.

In order that the jet regulator can perform its function optimally and can form the water jet emerging from the water outlet, it is necessary for a certain quantity of water to flow through the jet regulator. Since the jet splitter and if appropriate also the downstream functional units of the jet regulator form a flow resistance, there is the risk at low pressures that a sufficient water quantity cannot flow through the jet regulator, and the jet regulator cannot perform its function, and that the water jet emerging from the jet regulator is perceived as being unpleasant.

SUMMARY

It is in particular the object to create a sanitary installation element which always provides an optimum throughflow cross section both in low pressure ranges and also in high pressure ranges.

Said object is achieved according to the invention in the sanitary installation element of the type mentioned in the introduction in particular in that the sanitary installation element has an admixing device with at least one throttling or closing element which can move, under the pressure of the inflowing water, from an admixing or open position into a throttling or closed position counter to a restoring force, with the admixing device, in the admixing or open position of at least one throttling or closing element, providing a relatively large clear throughflow cross section, and in the throttling or closed position of the at least one throttling or closing element, providing a reduced clear throughflow cross section in relation thereto.

In the installation element according to the invention, an admixing device with at least one throttling or closing element is provided at the inflow side, which throttling or closing element can move, under the pressure of the inflowing water, from an admixing or open position into a throttling or closed position counter to a restoring force, with the admixing device, in the admixing or open position of at least one throttling or closing element, providing a relatively large clear throughflow cross section, and in the throttling or closed position of said at least one throttling or closing element, providing a reduced clear throughflow cross section in relation thereto. Since the at least one throttling or closing element closes with increasing water pressure, the throughflow curve through the installation element according to the invention can be varied such that an optimum throughflow cross section can always be provided both in low pressure ranges and also in high pressure ranges.

Here, it may be advantageous if the installation element is embodied as a throttle which, in high pressure ranges, holds open only a reduced clear throughflow cross section.

One preferred embodiment according to the invention, however, provides that the installation element according to the invention is embodied as a jet regulator which is arranged in the water outlet of a sanitary outlet fitting. In such an embodiment, the throughflow curve which is characteristic of conventional jet regulators, and which has the form of a root function if the throughflow (y axis) is plotted against the pressure (x axis), can be considerably improved. Specifically, a sufficient water quantity to allow the jet regulator to perform its function optimally and to form a homogeneous, soft and non-sputtering water jet which is perceived by the user as being pleasant flows through the installation element, which is embodied as a jet regulator, even in relatively low pressure ranges. The throughflow curve of the installation element which is embodied as a jet regulator can thus always be kept in a comfort zone both at relatively low pressure and also at relatively high pressure.

It is particularly advantageous if the installation element has a jet splitter which divides the inflowing water flow into a multiplicity of individual jets, and if the admixing device is provided upstream of the jet splitter at the inflow side.

Here, one preferred embodiment of the invention provides that the at least one throttling or closing element, in its throttling or closed position, closes off a partial region of the jet splitter inlet and/or of the clear passage cross section of the jet splitter and/or a bypass duct which bypasses at least the jet splitter of the jet regulator. If the at least one throttling or closing element, in its throttling or closed position, closes off for example a partial region of the clear throughflow cross section of the jet regulator or a bypass duct which bypasses the jet splitter of the jet regulator, the water flow, which flows in here under high pressure, is provided with only a clear throughflow cross section which is reduced in relation thereto.

Here, one embodiment of the invention provides that the admixing device has at least one bypass duct whose duct opening is provided upstream of the jet splitter in the flow direction. The partial quantity of the inflowing water which also flows through the bypass duct in low pressure ranges can pass the installation element according to the invention while bypassing the jet splitter thereof.

In order that the throttling or closing element can act as a water throttle in its throttling or closed position, it is advantageous if the at least one throttling or closing element, in its throttling or closed position, covers a partial region of the clear passage cross section of the jet splitter, or the edge region which borders the duct opening, at the inflow side. In said throttling or closed position, the inflowing water is prevented from accessing that partial region of the jet splitter which is covered by the throttling or closing element, or the bypass duct which is situated under the throttling or closing element.

The throttling or closing element may reduce the clear throughflow cross section of the installation element in the throttling or closed position if at least one throttling or closing element has at least one throttling opening which has a clear throttle opening cross section which is reduced in relation to the partial region, which is covered by the throttling or closing element in the throttling or closed position, of the clear passage cross section of the jet splitter or in relation to the duct opening.

In order that the installation element according to the invention cannot be impaired in terms of its function by the dirt particles which may be contained in the inflowing water flow, it is advantageous if an ancillary or filter sieve is positioned upstream of the installation element in the flow direction. Here, the dirt particles which may be contained in the water can be collected in the flow direction upstream of the installation element if the ancillary or filter sieve is of funnel-shaped design.

One refinement of the invention, which is worthy of protection in itself, provides that the funnel opening of the funnel-shaped ancillary or filter sieve is embodied as a duct opening of the bypass duct, and that said duct opening has a clear opening cross section which is larger in relation to the filter openings of the ancillary or filter sieve. The dirt particles which have collected in the ancillary or filter sieve in the throttling or closed position can thereby be automatically discharged out of the region of the jet splitter when the throttling or closing element which is situated in the funnel opening moves back into its admixing or open position in the event of falling water pressure. Said refining embodiment of the installation element according to the invention is therefore not only characterized by a mode of operation which remains in the comfort zone at all times, but in fact, practically automatic cleaning which takes place at time intervals is also provided in the region of the installation element according to the invention.

Since the jet splitter has a multiplicity of small throughflow openings, and since the clear throughflow cross section of the functional units which are situated downstream of the jet splitter in the flow direction is generally larger, it is expedient if the duct outlet of at least one bypass duct is provided in the flow direction upstream of the at least one functional unit, which is positioned in the flow direction downstream of the jet splitter.

To always keep the water jet which is formed in the installation element according to the invention in the comfort zone even over a wide pressure range, it is advantageous if the admixing device has at least two throttling elements and/or if at least one throttling element has at least two throttling element partial regions which can be moved from their admixing or open position into their throttling or closed position at different, preferably stepped water pressures.

One preferred embodiment of the invention provides that at least one throttling or closing element is provided upstream of the jet splitter at the inflow side, and that the at least one throttling or closing element can be moved, at least with at least one partial region under the pressure of the inflowing water flow, from an admixing or open position, which is spaced apart from the inflow side of the jet regulator, into a throttling or closed position counter to a restoring force, in which throttling or closed position the at least one throttling or closing element covers at least one first partial region of the jet splitter inlet and reduces the inflow of the water flow to the remaining partial region of the jet splitter inlet and/or to at least one throttling opening which is provided in the throttling or closing element.

The functional principle of the installation element according to the invention may advantageously be used in connection with an extremely wide variety of jet splitter designs. For example, one embodiment of the invention provides that the jet splitter is embodied as a diffuser, while a different embodiment thereto has a jet splitter which is embodied as a perforated plate.

To be able to produce the installation element according to the invention from only a small number of constituent parts as simply and cost-effectively as possible, it is advantageous if at least one throttling or closing element is produced from elastic material and can be deformed, under the pressure of the inflowing water flow against the inherent elasticity of the throttling element material, in such a way that the throttling or closing element which is deformed in the throttling or closed position covers at least a partial region of the jet splitter and/or of the jet splitter inlet and/or of the duct opening of the bypass duct.

Here, one embodiment of the invention may for example consist in that the at least one throttling or closing element is of shield-like design and, in at least one throttling or closed position, at least with a segment of its shield or shield edge region, covers at least a partial region of the jet splitter and/or of the jet splitter inlet and/or of the duct opening of the bypass duct.

To be able to also actuate an installation element with a shield-like throttling or closing element composed of elastic material in a stepped fashion over a wide pressure range, it may be advantageous if the shield of the shield-like throttling or closing element is divided in the circumferential direction into shield segments which are deformable separately from one another, and if the shield segments of a throttling or closing element are deformable preferably in different and in particular stepped pressure ranges.

To be able to always keep the throttling or closing element in its functional position in the region of the jet splitter or of the duct opening of the bypass duct, it is advantageous if at least one throttling or closing element is held on the jet splitter preferably at the inflow side.

One particularly simple embodiment of the invention which is cost-effective to produce provides that at least one throttling or closing element which is produced from elastic material can be deformed from a funnel shape, which is provided in the admixing or open position, into a shield shape, bearing against the jet splitter, in the throttling or closed position. Here, the initially funnel-shaped throttling or closing element is deformed under increasing water pressure into a shield shape which bears preferably at the edge side against the jet splitter and/or against the edge region which borders the duct opening of the bypass duct.

The throttling or closing element may also be produced from firm and deformation-resistant material if at least one throttling or closing element is movable in the axial direction between an admixing or open position, which is spaced apart from the jet splitter, and the throttling or closed position.

Here, it is advantageous if at least one restoring spring, which is preferably designed as a pressure spring, is provided as a restoring force.

BRIEF DESCRIPTION OF THE DRAWINGS

Refinements of the invention can be gathered from the claims in connection with the drawings. The invention is explained in even more detail below on the basis of advantageous exemplary embodiments.

In the drawings:

FIGS. 46 to 51 show a jet regulator in the region of its jet splitter, whose admixing device can likewise be actuated in a stepped fashion, wherein for this purpose, a plurality of annularly encircling sealing lips are provided on the inflow side of the jet splitter, which sealing lips, in the associated throttling or closed position which can be activated in a pressure-dependent fashion, close off one of a plurality of coaxially arranged hole circles of the jet splitter which is embodied as a perforated plate, FIG. 52 shows the throughflow curve of the jet regulator illustrated in FIGS. 40 to 45 and 46 to 51, FIGS. 53 and 54 show a jet regulator having a throttling or closing element which is movable axially counter to a restoring spring, which throttling or closing element, in its throttling or closed position shown in FIG. 54, covers a first partial region of the jet splitter inlet and reduces the inlet of the inflowing water flow to the remaining partial region.

DETAILED DESCRIPTION OF THE PREFERRED EMBODIMENTS

Figure 1:
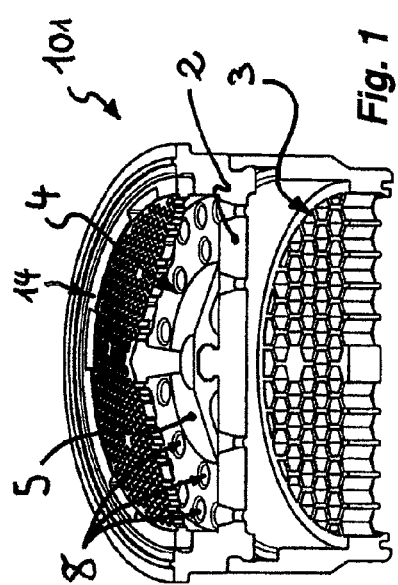
FIGS. 1 and 2 show a jet regulator having an admixing device which, in its throttling or closed position illustrated here, reduces the clear throughflow cross section of a jet splitter which is provided in the jet regulator, with the jet regulator being shown in a perspective longitudinal section in FIG. 1 and in a partially sectioned side view in FIG. 2, FIGS. 3 and 4 show the jet regulator from FIGS. 1 and 2 in the admixing or open position of the admixing device, in which the latter has the maximum clear throughflow cross section.

FIGS. 1 to 24 and 26 to 51 illustrate embodiments 101 to 114 of a sanitary installation part which is embodied here as a jet regulator. Said jet regulators 101 to 114, which are arranged in a sanitary outlet fitting (not illustrated in any more detail here), have a jet splitter 2 which divides the inflowing water flow into a multiplicity of individual jets before said individual jets are enriched with air and can be formed, in an outflow-side flow straightener 3, into a homogeneous and non-sputtering overall jet.

An admixing device 4 having at least one throttling or closing element 5 or 5' is positioned upstream of the jet splitters 2 of the jet regulators 101 to 114 shown in FIGS. 1 to 24 and 26 to 61 in the flow direction. The at least one throttling or closing element 5, 5' can move, under the pressure of the inflowing water, from an admixing or open position, shown in FIGS. 3, 4; 7, 8; 11, 12; 15, 16; 19, 20; 23, 24; 26, 27; 30, 31; 34; 40, 41; 46, 47; 53; 55 and 58, 59, into a throttling or closed position, shown in FIGS. 1, 2; 5, 6; 9, 10; 13, 14; 17, 18; 21, 22; 28, 29; 32, 33; 35 to 39; 42 to 45; 48 to 51; 54; 56 and 60, 61, counter to a restoring force. Here, the at least one throttling or closing element 5, 5', in its admixing or open position, provides a relatively large clear throughflow cross section, and in the at least one throttling or closed position, provides a reduced clear throughflow cross section in relation thereto.

The jet regulators 101 to 114 illustrated here are characterized in that said jet regulators 101 to 114 can considerably improve the throughflow curve which is characteristic of conventional jet regulators and which has the form of a root function if the throughflow (y axis) is plotted against the pressure (x axis). Specifically, by means of the jet regulators 101 to 114 illustrated here, a sufficient water quantity to allow said jet regulators 101 to 114 to perform their function optimally and to form a homogeneous and non-sputtering water jet which is perceived by the user as being pleasant flows through the installation element even in relatively low pressure ranges. For this purpose, in the jet regulators 101 to 114 illustrated here, the admixing device 4 is provided, upstream of the jet splitter 2 at the inflow side, with at least the one throttling or closing element 5, 5', which throttling or closing element 5, 5' can move, under the pressure of the inflowing water, from an admixing or open position into a throttling or closed position counter to a restoring force, with the admixing device 4, in the throttling or closed position of at least one throttling or closing element 5, 5', providing a relatively large clear throughflow cross section, and in the throttling or closed position of said at least one throttling or closing element 5, 5', providing a reduced clear throughflow cross section in relation thereto through the jet regulator 101 to 114.

While the jet regulators 101 to 103, 107 to 111 and 114 shown in FIGS. 1 to 12, 26 to 61 and 58 to 61 have a jet splitter 2 which is embodied as a perforated plate, the jet splitter 2 of the jet regulators 104 to 106 and 112 to 113 illustrated in FIGS. 13 to 24 and 53 to 57 is embodied as a diffuser which divides the inflowing water flow into a multiplicity of individual jets in the wall apertures 6, which are spaced apart from one another preferably uniformly in the circumferential direction, of a peripheral wall 7.

Figure 2:
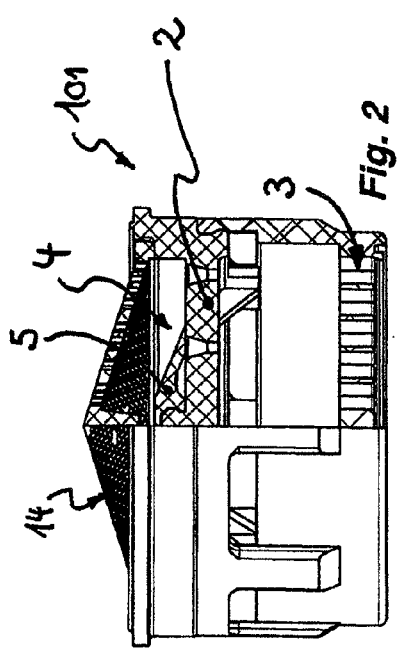
Figure 3:
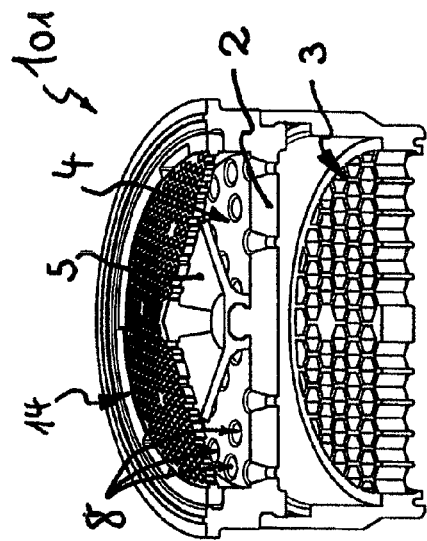
Figure 4:
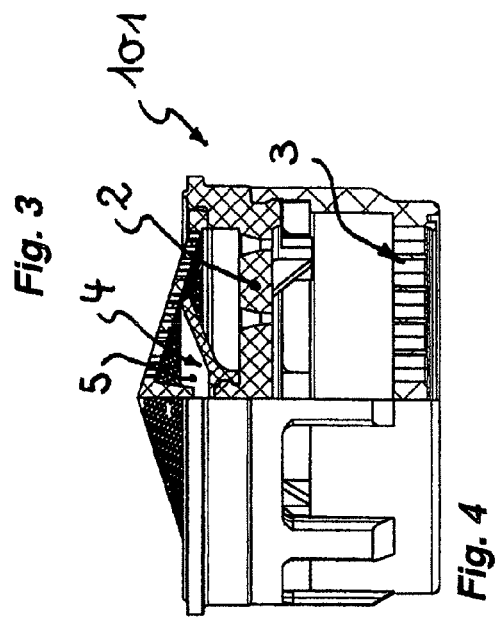

FIGS. 1 to 4 illustrate a jet regulator 101 with a jet splitter 2 which is embodied as a perforated plate. Here, the throttling or closing element 5 which is arranged upstream of the jet splitter 2 at the inflow side and which is held on the jet splitter 2 by means of a latching connection is produced from elastic material. Said elastic throttling or closing element 5 can be deformed or moved, under the pressure of the inflowing water flow, and counter to the inherent elasticity, which serves to provide a restoring force, of the throttling or closing element material, from an admixing or open position, which is spaced apart from the inflow side of the jet splitter 2, into a throttling or closed position in which the throttling or closing element—as shown in FIGS. 3 and 4—covers a central partial region of the jet splitter inlet and reduces the inlet of the inflowing water flow to the remaining partial region of the jet regulator flow.

Here, it is clear from a comparison of FIGS. 1 and 2 on the one hand and FIGS. 3 and 4 on the other hand that the throttling or closing element 5 can be deformed from a funnel shape, which is provided in the admixing or open position, into a shield shape in the throttling or closed position, in which shield shape the throttling or closing element 5 bears sealingly at least with its shield edge against the jet splitter 2 at the inflow side and closes off at least one inner hole circle of the throughflow holes 8, which are arranged in concentric hole circles, of the jet splitter 2.

Figure 5:
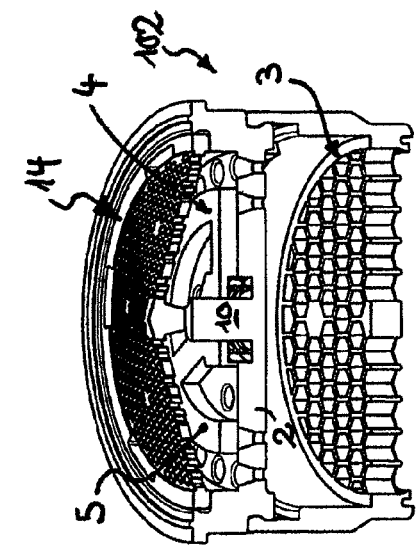
FIGS. 5 and 6 show a jet regulator having an admixing device which has a throttling or closing element which is produced from a deformation-resistant material and which is guided so as to be movable in the axial direction and which is movable into its closed position illustrated here counter to a restoring spring.
Figure 6:
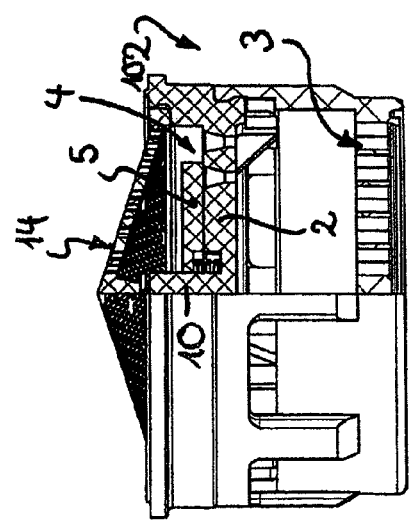
Figure 7:
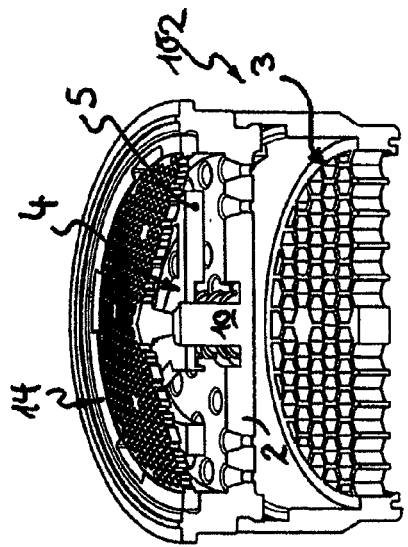
FIGS. 7 and 8 show the jet regulator from FIGS. 5 and 6 in the admixing or open position of its throttling or closing element.
Figure 8:
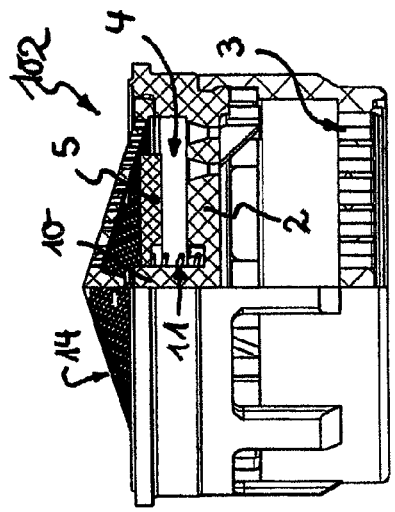
Figure 9:
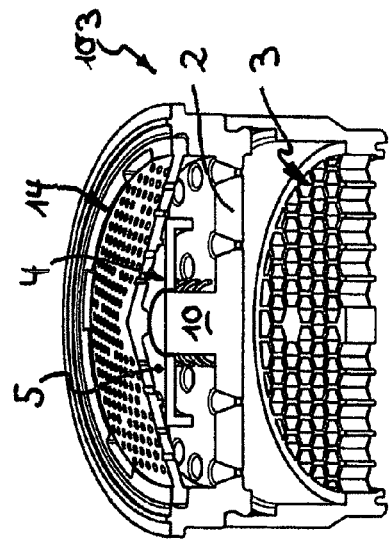
FIGS. 9 and 10 show a jet regulator of similar design to that in FIGS. 5 to 8 in the throttling or closed position of its throttling or closing element which is produced from deformation-resistant material and which is formed in the shape of an annular disk.
Figure 10:
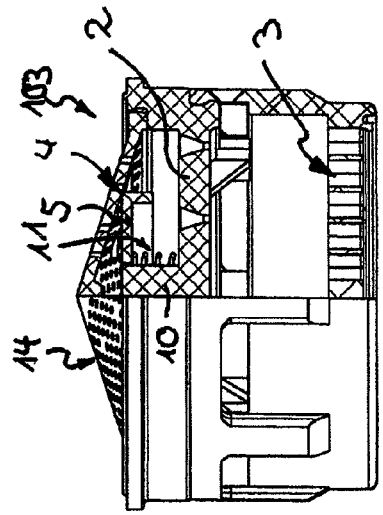
Figure 11:
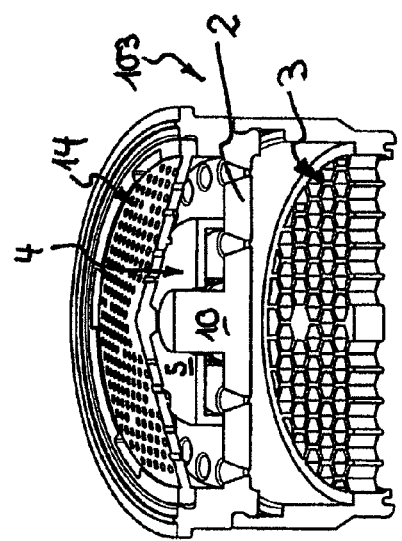
FIGS. 11 and 12 show the jet regulator from FIGS. 9 and 10 in the admixing or open position of the throttling or closing element.
Figure 12:
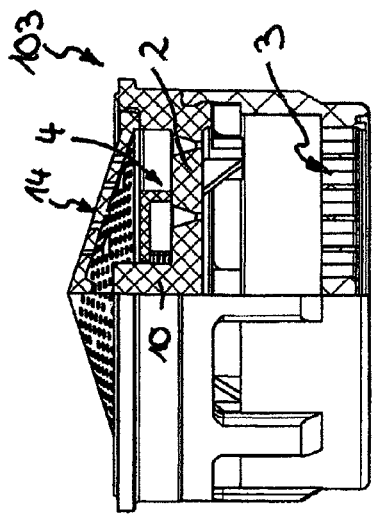
Figure 13:
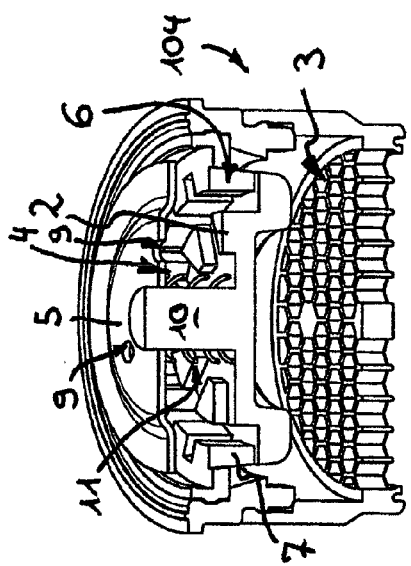
FIGS. 13 and 14 show a jet regulator which is shown in the throttling or closed position of its plate-shaped throttling or closing element, which jet regulator has a jet splitter which is embodied as a diffuser.
Figure 14:
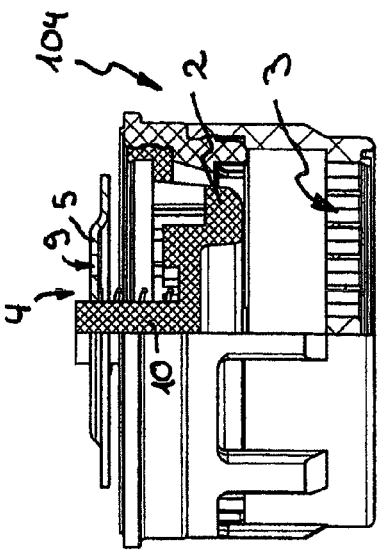
Figure 15:
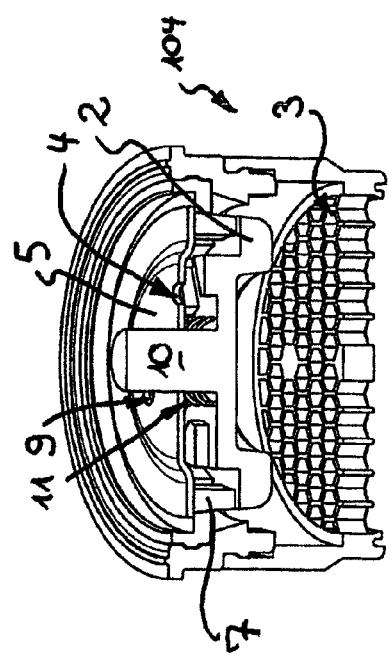
FIGS. 15 and 16 show the jet regulator from FIGS. 13 and 14 in the admixing or open position, which is held by the restoring spring, of its throttling or closing element.
Figure 16:
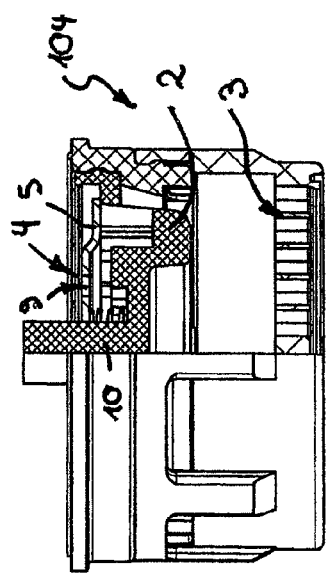
Figure 17:
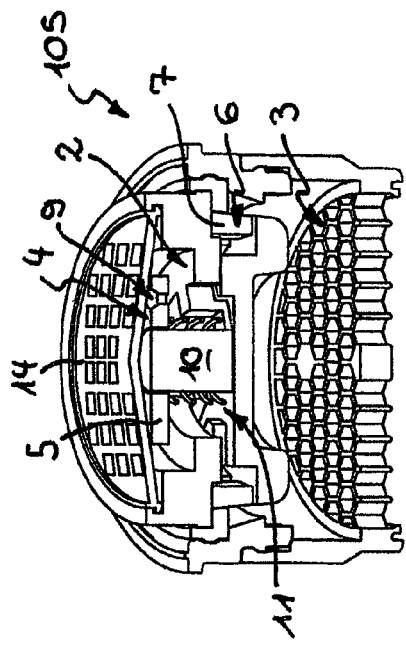
FIGS. 17 and 18 show a jet regulator of similar design to that in FIGS. 13 to 16, and additionally fitted with an ancillary or filter sieve which is positioned upstream of the jet regulator inlet, in the throttling or closed position of its throttling or closing element.
Figure 18:
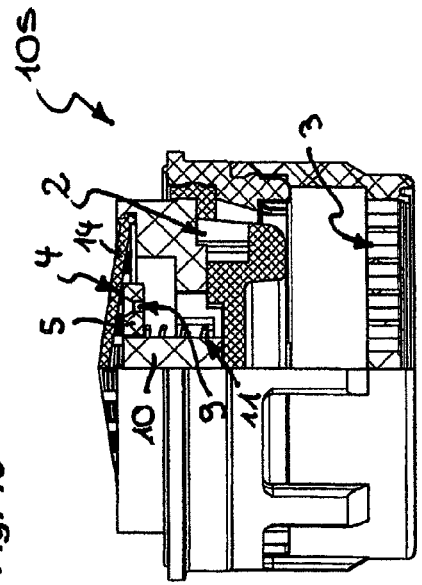
Figure 19:
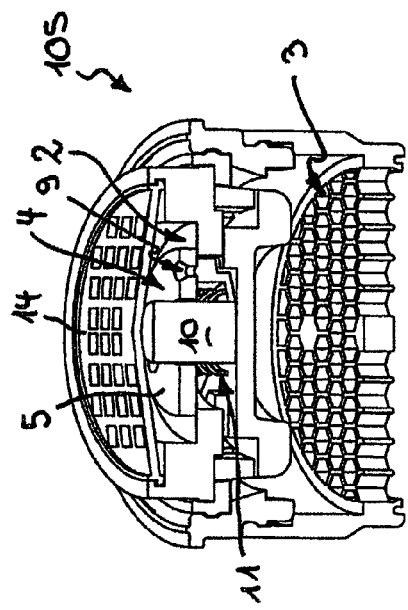
FIGS. 19 and 20 show the jet regulator from FIGS. 17 and 18 in the admixing or open position, which is held by the restoring spring, of the throttling or closing element.
Figure 20:
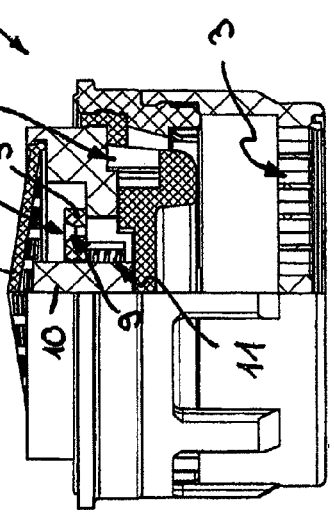
Figure 23:
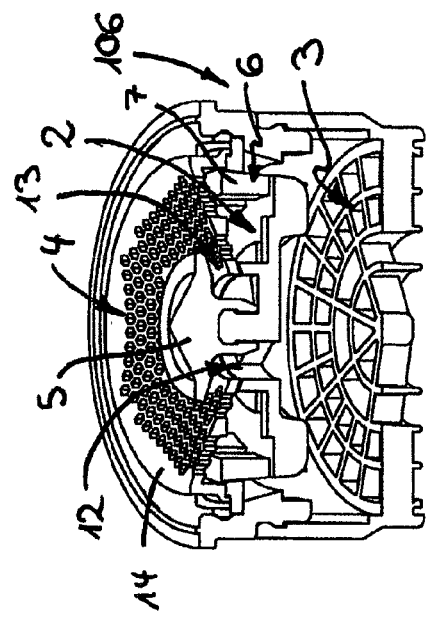
Figure 24:
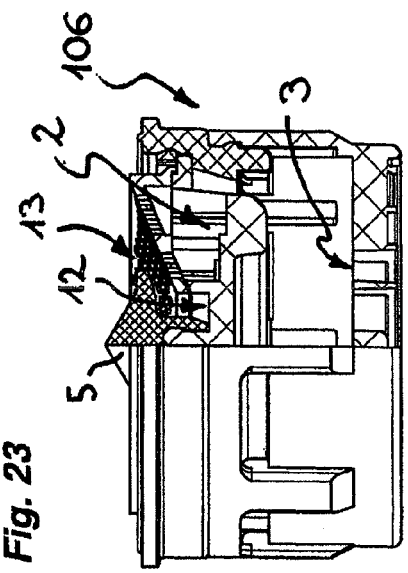
Figure 21:
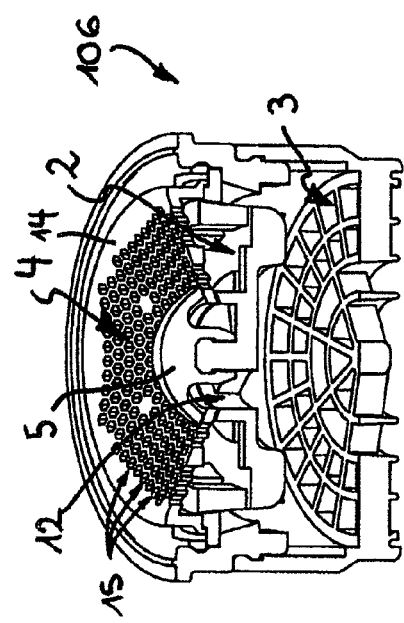
FIGS. 21 and 22 show a jet regulator in an admixing device which has a bypass duct which bypasses the jet splitter of the jet regulator, with a throttling or closing element which is embodied as a closing valve and which is composed of elastic material being assigned to the bypass duct, which throttling or closing element is situated in its throttling or closed position in FIGS. 21 and 22, FIGS. 23 and 24 show the jet regulator from FIGS. 21 and 22 in the admixing or open position of its throttling or closing element.
Figure 22:
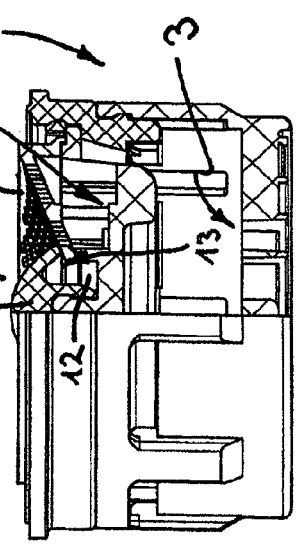

The jet regulators 102 to 105 illustrated in FIGS. 5 to 20, in contrast, have a throttling or closing element 5 which is produced from deformation-resistant material and which can be moved between an admixing or open position, which is spaced apart from the jet splitter 2 and which is shown in FIGS. 7, 8; 11, 12; 15, 16 and 19, 20, and a throttling or closing position which is illustrated in FIGS. 5, 6; 9, 10; 13, 14 and 17, 18, in which throttling or closing position the corresponding throttling or closing element 5 covers a partial region of the jet splitter inlet. While the throttling or closing element 5 of the jet regulators 102, 103 shown in FIGS. 5 to 12 covers, for this purpose, a partial number of the throughflow holes provided in the jet splitter 2, the throttling or closing element of the jet regulators 104, 105 depicted in FIGS. 13 to 20 completely seals off the jet splitter 2, which is embodied as a diffuser, at the peripheral edge, such that the jet splitter inlet to the throttling openings 9 provided in the throttling or closing elements 5 is reduced. In each case one axial guide journal 10 projects from the jet splitters 2 of the jet regulators 102 to 105 shown in FIGS. 5 to 20 at the inflow side, on which axial guide journal 10 the corresponding throttling or closing element 5 is guided in a movable manner by means of a complementary guide opening. The throttling or closing elements 5 of the jet regulators 102 to 105 depicted in FIGS. 5 to 20, which throttling or closing elements 5 may be of ring-shaped, wheel-shaped or disk-shaped design, can be moved, under the pressure of the inflowing water, from the admixing or open position into their throttling or closed position counter to the restoring force of a pressure spring 11.

While the throttling or closing element 5 of the jet regulator 102 has a circular-ring-shaped partial region with radial spokes for central guidance, the throttling or closing element 5 of the jet regulators 103, 104, 105 is of pot-shaped, plate-shaped or disk-shaped design.

The jet regulator 106 which is shown in FIGS. 21 to 24 and which has a jet splitter 2 which is designed as a diffuser has a centrally arranged bypass duct 12 which bypasses or extends through the jet splitter 2, the duct opening 13 of which bypass duct 12 is provided upstream of the jet splitter 2 in the flow direction. A mushroom-shaped or shield-shaped throttling or closing element 5 composed of elastic material is positioned upstream of the bypass duct 12 in the flow direction, which throttling or closing element 5 can be moved, under the pressure of the inflowing water, from the admixing or open position shown in FIGS. 23 and 24 into a throttling or closed position in which the throttling element or closing element 5 provides only a reduced throughflow cross section through the jet regulator 106. In said throttling or closed position shown in FIGS. 21 and 22, the throttling or closing element 5 sealingly covers the edge region which borders the duct opening 13, in such a way that the bypass duct 12 is closed off.

A filter or ancillary sieve 14 is positioned upstream of the jet regulators 101 to 103 and 105 to 106 illustrated in FIGS.

1 to 12 and 17 to 24, which filter or ancillary sieve 14 is intended to filter out the dirt particles contained in the water, which dirt particles could otherwise block the jet splitter 2 and impair the function of the jet regulators 101 to 103, 105, 106.

The jet regulator 106 shown in FIGS. 21 to 24 also has an ancillary or filter sieve 14 of said type, which ancillary or filter sieve 14 is embodied here in the shape of a funnel. Here, the central funnel opening of the funnel shaped ancillary or filter sieve 14 is embodied as a duct opening 13 of the bypass duct 12. Since the mushroom-shaped or plate-shaped throttling or closing element 5 which is composed of elastic material deforms or moves into its open or admixing position in the event of falling water pressure or an interruption in the water supply, such dirt particles which have collected in the filter sieve 14 can be discharged practically automatically at time intervals through the bypass duct 12 which has a larger clear duct or opening cross section in relation to the filter openings 15 of the ancillary or filter sieve 14. Said dirt particles which are discharged through the bypass duct 12 therefore need no longer pass through the jet splitter 2—in fact, said dirt particles only emerge again downstream of the jet splitter 2 in the flow direction, with the flow straightener 3 which is positioned downstream of the jet splitter 2 having a significantly larger clear throughflow cross section.

Figure 25:
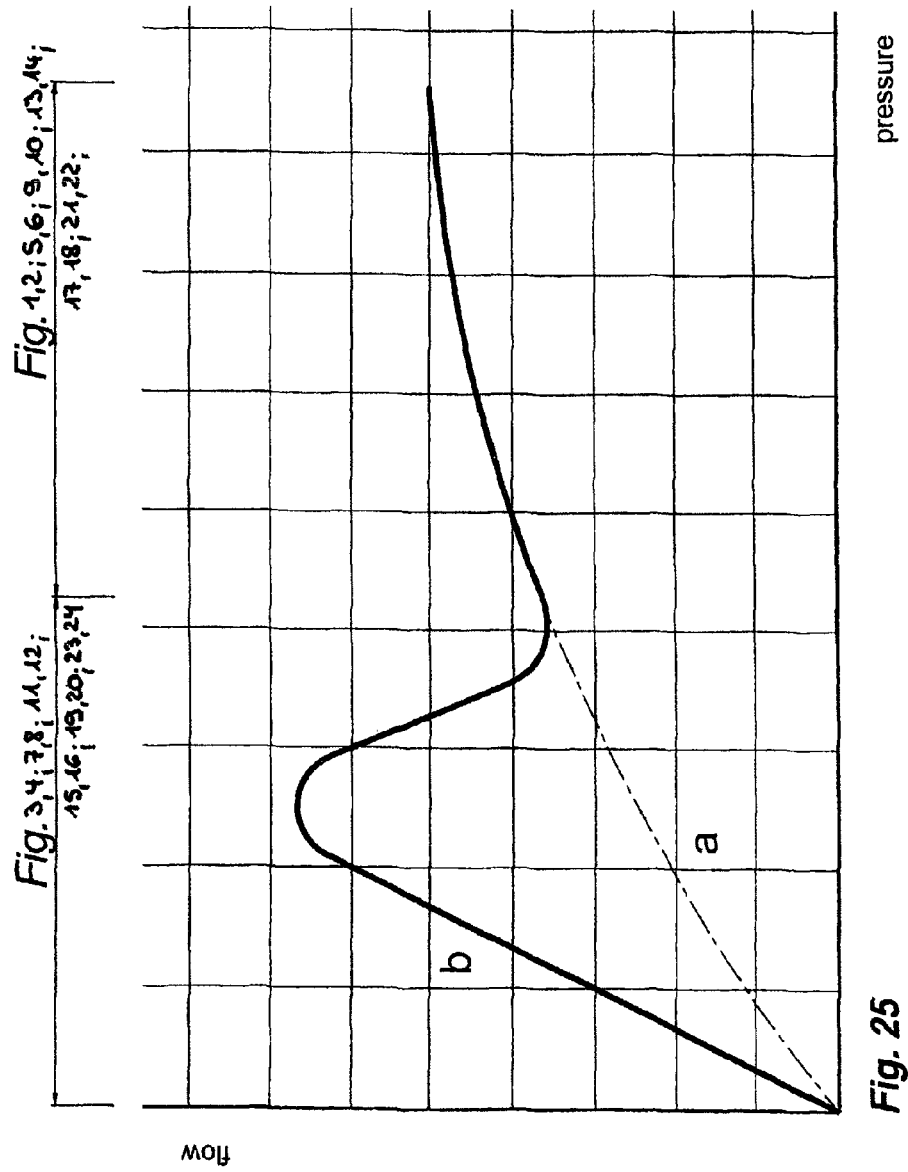
FIG. 25 shows the throughflow curve of the jet regulator shown in FIGS. 1 to 24 (solid line) in comparison with the throughflow curve of a conventional jet regulator designed according to the prior art (dash-dotted line)
Figure 26:
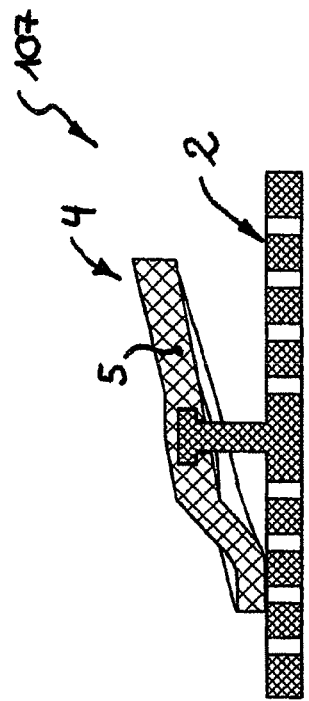
FIGS. 26 and 27 show a jet regulator, schematically illustrated only in the region of its jet splitter, in the admixing or open position of its throttling or closing element which is produced from elastic material.
Figure 27:
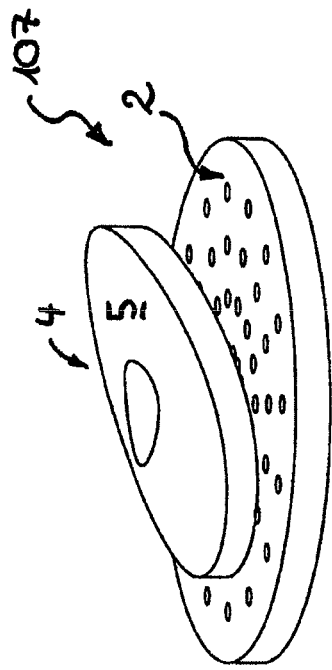
Figure 28:
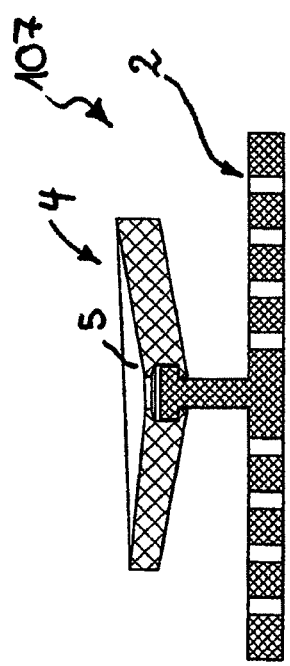
FIGS. 28 and 29 show the jet regulator from FIGS. 26 and 27 in one of several throttling or closed positions of its throttling or closing element, with the throttling or closing element, in each of said throttling or closing positions which can be assumed in a pressure-dependent fashion, closing off a further partial region of the clear throughflow cross section of the jet splitter.
Figure 29:
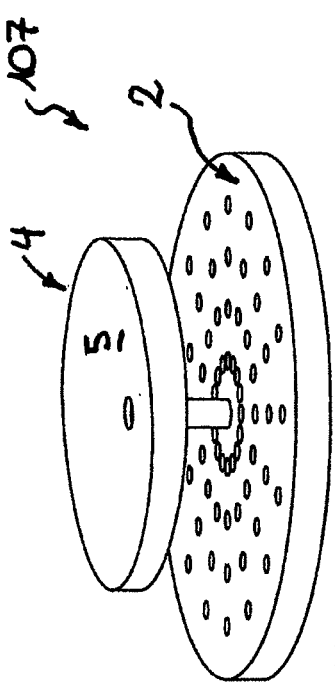
Figure 30:
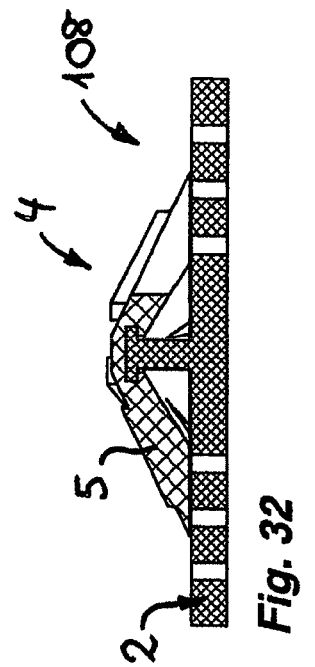
FIGS. 30 and 31 show a jet regulator, likewise schematically illustrated in the region of its jet splitter, which has a throttling or closing element which is divided by radial incisions into individual throttling element segments and which is composed of elastic material.
Figure 31:
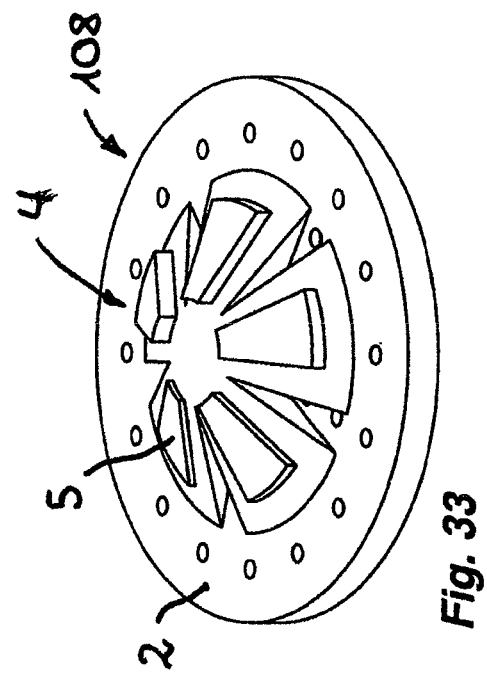
Figure 32:
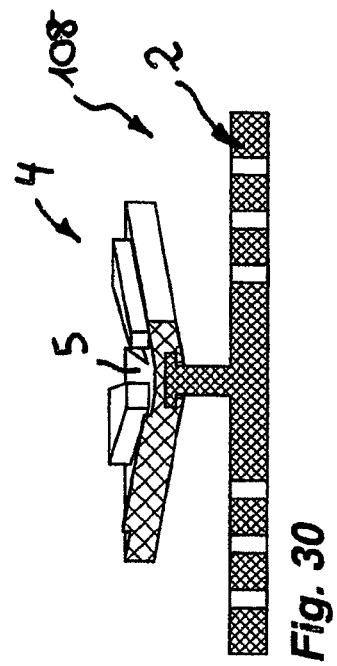
FIGS. 32 and 33 show the jet regulator from FIGS. 30 and 31 in one of the throttling or closed positions of its throttling or closing element, wherein in FIGS. 32 and 33, all the throttling element segments of said throttling or closing element are bearing sealingly, at the inflow side, against the associated partial regions of the jet regulator.
Figure 33:
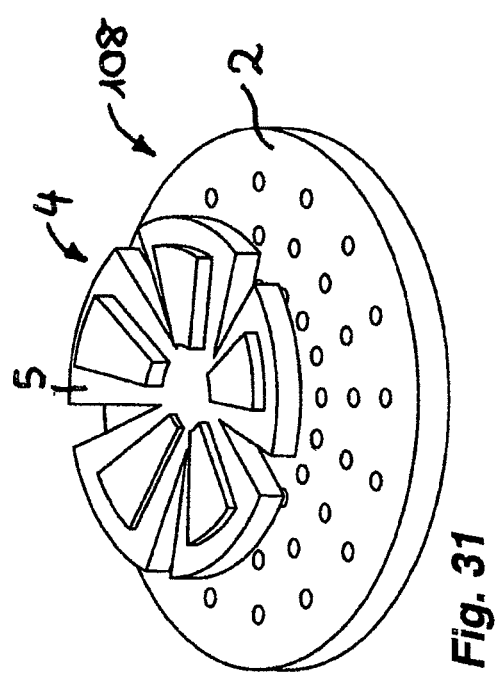
Figure 34:
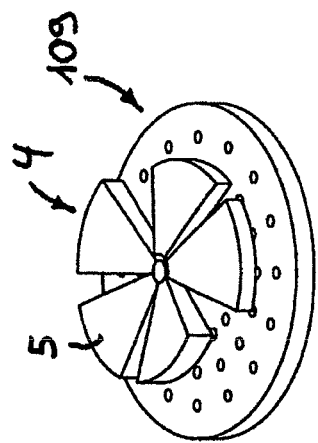
FIGS. 34 to 39 show a jet regulator likewise schematically illustrated in the region of its jet splitter, which jet regulator has a throttling or closing element of similar design to that in FIGS. 30 to 33, with the throttling or closing element being illustrated in its admixing or open position in FIG. 34 and in various throttling or closed positions of its throttling or closing element in FIGS. 35 to 39, FIGS. 40 and 41 show a jet regulator whose admixing device has two throttling or closing elements which can be activated in a stepped fashion, with said throttling or closing elements, which are in each case movable in the axial direction counter to an associated restoring spring, being situated in each case in their admixing or open position in FIGS. 40 and 41, FIGS. 42 and 43 show the jet regulator from FIGS. 40 and 41, wherein in FIGS. 42 and 43, only one of the throttling or closing elements is situated in its admixing or open position, while the lower throttling or closing element in this case has already been moved into its throttling or closed position by the increasing water pressure.
Figure 37:
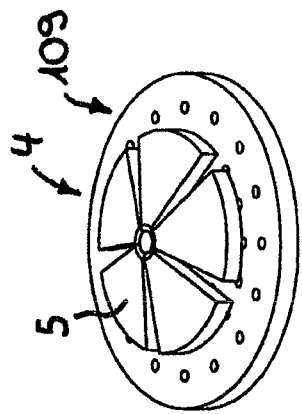
Figure 35:
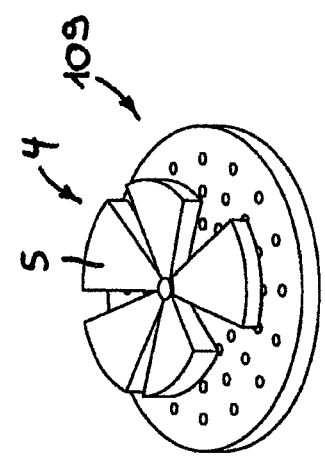
Figure 38:
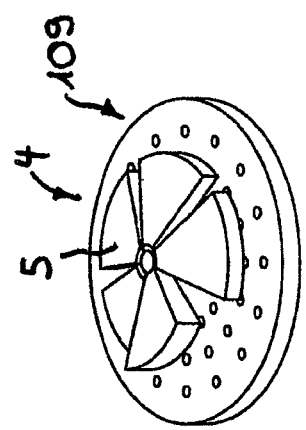
Figure 36:
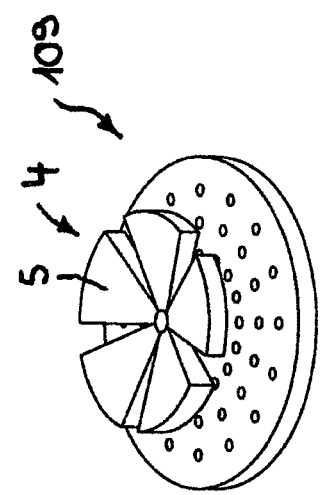
Figure 39:
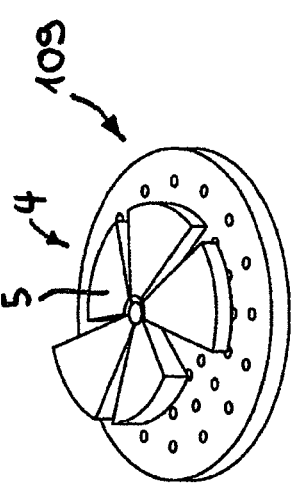
Figure 40:
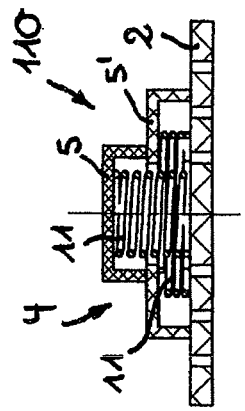
Figure 42:
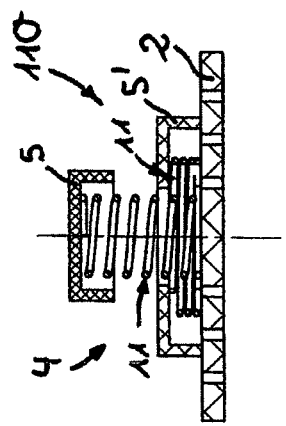
Figure 44:
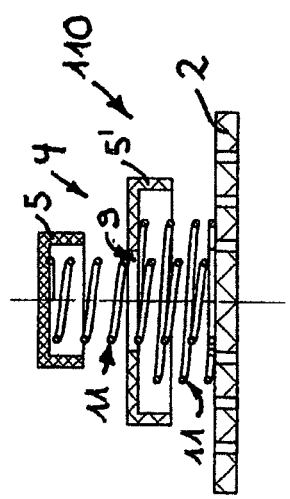
FIGS. 44 and 45 show the jet regulator from FIGS. 40 to 43 in the throttling or closed position of its two throttling or closing elements.
Figure 41:
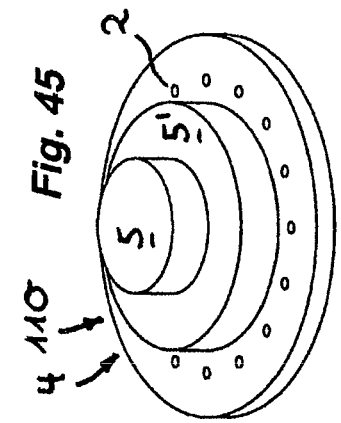
Figure 43:
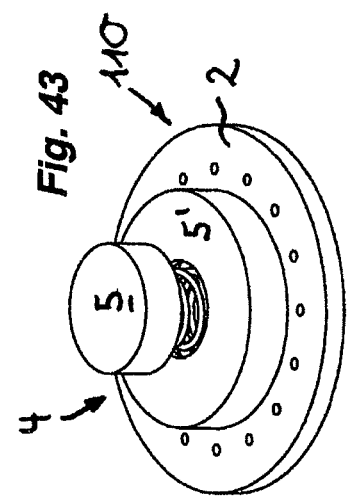
Figure 45:
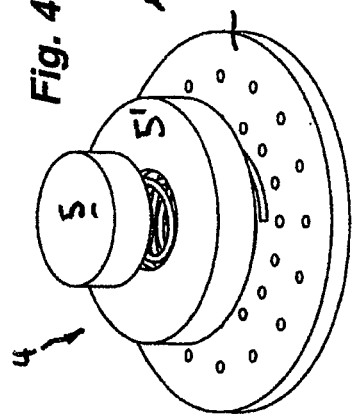

FIG. 25 shows a typical throughflow curve which can be obtained with the jet regulator designs 101 to 106. The curve a, which is illustrated by means of a dash-dotted line, shows the throughflow behavior of a jet splitter which is used in the prior art, whereas the curve b, which is illustrated as a solid line, has a very steep rise in the throughflow in the low pressure range on account of the bypass effect of the still-open throttling or closing elements 5, which very steep rise reduces with increasing pressure on account of the closure of the throttling or closing elements 5 and, at relatively high pressure, is congruent with the curve a which has the typical throughflow behavior of a jet splitter 2 with throttling or closing elements situated in the throttling or closed position.

FIGS. 26 to 51 illustrate jet regulators 107 to 111 having an admixing device 4 which has either a plurality of throttling or closing elements 5, 5' or a throttling or closing element 5 which is segmented into partial regions or segments, which throttling or closing element 5, in different throttling or closing positions, covers in each case a partial region of the jet splitter inlet.

The throttling or closing element 5 of the jet regulator 107 shown in FIGS. 26 to 29 is therefore formed as a body which is produced from elastic material and which is deformable under pressure and which, in a stepped fashion, closes off individual partial regions of the jet splitter 2, which is embodied as a perforated plate, as a function of the water pressure. To arrive here at a multi-stage closure principle, as illustrated in FIGS. 26 to 29, the jet regulator 107 is designed such that its throttling or closure element 5 has different stiffnesses and therefore deforms partially with rising pressure corresponding to the stiffness or elasticity. Here, the throttling or closing element 5 is embodied as a plate-shaped elastic disk which has a circumferentially varying wall thickness and which therefore deforms even at low pressure in the region of the thinnest wall thickness.

The shield-shaped throttling or closing element 5 of the jet regulator 108 shown in FIGS. 30 to 33 is divided in the circumferential direction into shield segments which can deform separately from one another, in such a way that said throttling or closing element 5 practically forms a flower-shaped disk which is composed of individual elements on account of the radial incisions. Said individual segments or disk elements may have different stiffnesses on account of additionally different material accumulations. Furthermore, though not illustrated in this case, it is also possible for different depths of radial incisions and/or different widths of the individual flower-petal-like segments or disk elements to border different stiffnesses.

FIGS. 34 to 39 schematically illustrate a jet regulator 109 with a similar design of plate-shaped throttling or closing element 5, with different stiffnesses of the flower-petal-like segments or disk elements being obtained by means of different material thicknesses.

FIGS. 40 to 45 illustrate a jet regulator 110 which is similar to the jet regulators 102 to 105. However, the jet regulator 110 is of two-stage design and, for this purpose, has two throttling or closing elements 5, 5' which are movable separately from one another in the axial direction and which are each of pot-shaped design and which are assigned restoring springs 11 which can be activated at different water pressures. While the throttling or closing elements 5, 5' of the admixing device 4 are illustrated in their unloaded admixing or open position in FIGS. 40 and 41, FIGS. 42 and 43 show the throttling elements 5, 5' of the jet regulator 110 with rising water pressure, with firstly only the throttling or closing element 5 closing off the associated partial region of the jet splitter 2 which is embodied as a perforated plate, and therefore reducing the jet splitter inlet to the central throttle opening 9 through which the restoring spring extends. It is clear from FIGS. 44 and 45 that, at high pressure, the throttling or closing elements 5, 5' bear sealingly against one another, and against the jet splitter 2 at the inflow side, in such a way that the inflowing water flow can pass through the jet splitter 2 only via the hole circle which borders the throttling or closing elements 5, 5'.

The jet regulator 111 shown in FIGS. 46 to 51 likewise has a jet splitter 2 which is embodied as a perforated plate and which has a multi-stage admixing device 4. For this purpose, throttling or closing elements 5, 5' are integrally formed on the inflow side of the jet splitter 2, which throttling or closing elements 5, 5' are each embodied as annular sealing lips composed of elastic material and are assigned to at least one adjacent hole circle of the jet splitter 2. Said throttling or closing elements 5, 5' which are embodied as sealing lips respond at different water pressures by deforming, with the sealing lips, which are inclined with respect to the jet splitter 2 in the initial position, being pressed under the water pressure against the jet splitter 2 in such a way that the respective associated hole circle of the jet splitter 2 is sealingly closed off. At maximum water pressure, the inflowing water can pass through the jet splitter 2 only via the outer, uncovered hole circle—as illustrated in FIG. 51. FIG. 52 illustrates the throughflow curve of the jet regulators 110, 111 with their multi-stage admixing devices 4. It can be clearly seen that the throughflow through the jet regulators 110, 111 is always kept in a comfort zone, in which the jet regulator 110, 111 can form a homogeneous, sparkling and soft jet, by means of the throttling or closing elements 5, 5' which move into their open or closed position in a pressure-dependent and stepped fashion.

The installation elements 107 to 111 illustrated in FIGS. 26 to 51 may also be embodied as a simple throttle which is composed merely of the jet splitter 2 and the admixing device 4 which is arranged at the inflow side, and which is arranged at any desired point in a water line.

Figure 53:
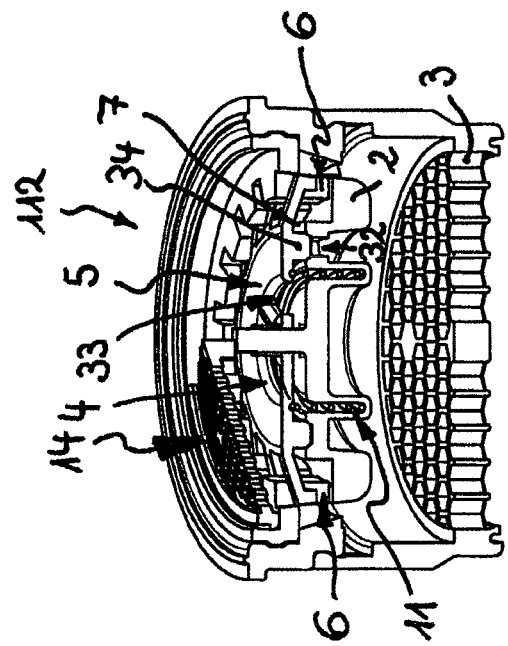
Figure 54:
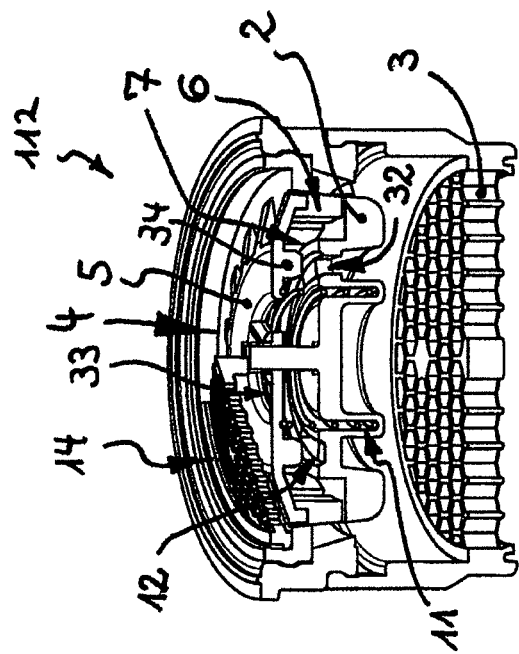

FIGS. 53 and 54 show a sanitary installation element 112 which is designed as a jet regulator which can be inserted into the outlet mouthpiece of a sanitary outlet fitting. The jet regulator 112 according to FIGS. 53 and 54 has an admixing device 4 with a throttling or closing element 5 which can be moved, under the pressure of the inflowing water, from an admixing or open position—illustrated in FIG. 53—into the throttling or closed position shown in FIG. 54 counter to the restoring force of a pressure spring 11. In said throttling or closed position, the admixing device 4 provides only a reduced clear throughflow cross section.

It can be seen in FIGS. 53 and 54 that the jet regulator 112 has a jet splitter 2 which divides the inflowing water flow into a multiplicity of individual jets and which is embodied as a diffuser. While the admixing device 4 is positioned upstream of the jet splitter 2, and an ancillary sieve 14 is positioned upstream of said admixing device 4, at the inflow side, a functional unit which is embodied as a flow straightener 3 is positioned downstream at the outflow side of the jet splitter 2, which flow straightener 3 is formed, for the preparation of a homogeneous, non-sputtering water jet, from a perforated plate with throughflow holes which are honeycomb-shaped in this case.

The throttling or closing element 5 which is held on the jet splitter 2 is guided in an axially movable fashion and is moved, under the pressure of the inflowing water, in the direction of the jet splitter 2 counter to the restoring force of the pressure spring 11 until the throttling or closing element 5 bears with a partial region against the jet splitter 2. The throttling or closing element 5 is of finger-shaped design at its peripheral edge region, with the projecting fingers of the throttling or closing element 5 engaging into the wall apertures 6, which are provided at the periphery, of the peripheral wall 7 of the diffuser 2. From a comparison of FIGS. 53 and 54, it is clear that the throttling or closing element 5 can engage into the wall apertures 6 of the diffuser 2 in such a way that the passage cross section is delimited in the region of said wall apertures 6 of the jet splitter 2.

In FIG. 53, it can be seen that the jet splitter 2 has an annular bypass duct 12, which is arranged coaxially with respect to the longitudinal central axis, with a plurality of duct openings 32 which are spaced apart uniformly and which are aligned in the axial direction and which, at low pressure, permit the throughflow of a maximum possible quantity of water through the jet regulator 112. Here, the water flow is divided up, with a part of the water flow running through the splitter system of the diffuser 2 into the edge region and being mixed there with inducted air, while a further part of the water flows through the duct openings 32 of the bypass duct 12 adjacent to the pressure spring 11 directly from the jet splitter 2 into the mixing chamber which is arranged downstream of the jet splitter 2 at the outflow side. In this way, it is possible to realize an extremely steep rise in throughflow. With rising pressure, the throttling or closing element 5 which is spring-mounted by means of the pressure spring 11 lowers and also closes off the duct openings 32 which are provided in the bypass duct 12, such that the water can subsequently flow only via the wall apertures 6, which are arranged in the peripheral region and which are likewise reduced in cross section, of the jet splitter 2.

To be able to deliver sufficient water into the bypass duct 12 at extremely low pressures at which the spring-mounted throttling or closing element 5 is situated in the open position, the throttling or closing element 5 is provided, in its center, with large apertures 33. In the closed position, in which the throttling or closing element 5 has lowered in the direction of the jet splitter 2, said apertures 33 have no effect, since the apertures 33 are sealed off by a conically truncated sealing ring 34 which engages around the apertures 33 and is integrally formed on the throttling or closing element 5 in a unipartite fashion on the outflow side of the throttling or closing element 5.

Figure 57:
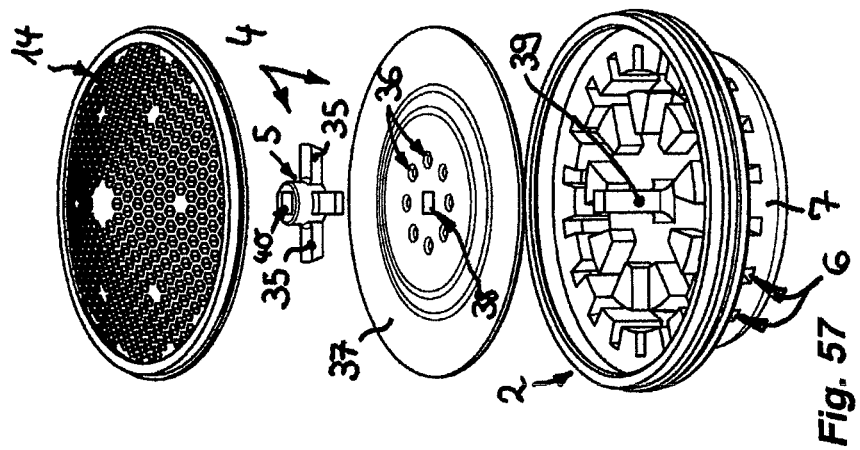
FIGS. 55 to 57 show a jet regulator having a throttling or closing element which is composed of elastic material and which, in the closed position shown in FIG. 56, covers a partial region of the jet regulator inlet.
Figure 56:
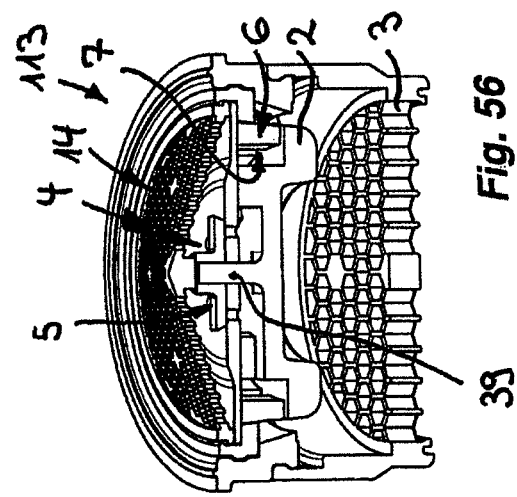
Figure 55:
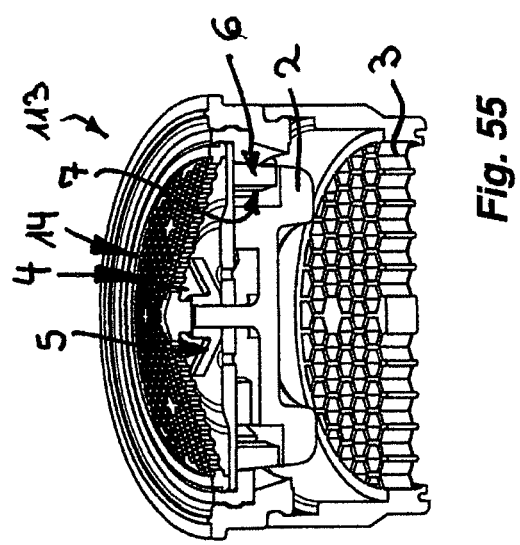
Figure 58:
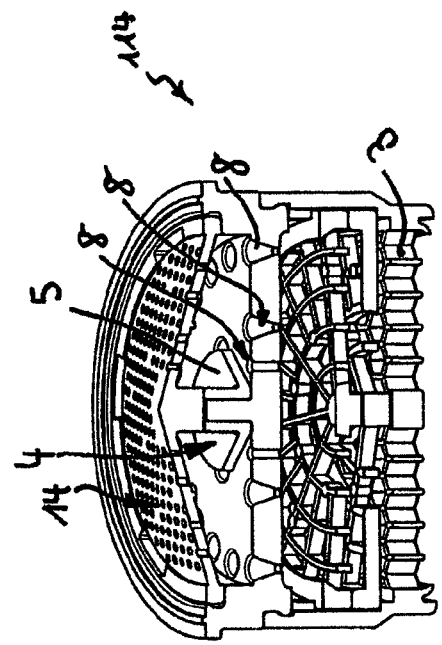
FIGS. 58 and 59 show a jet regulator having a throttling or closing element which is shown in its open position and which is composed of elastic material, with the jet regulator being illustrated in a perspective longitudinal section in FIG. 58 and in a lateral partial longitudinal section in FIG. 59, and FIGS. 60 and 61 show the jet regulator from FIGS. 58 and 59 in the closed position of its throttling or closing element, with the jet regulator being shown in a perspective longitudinal section in FIG. 60 and in a lateral partial longitudinal section in FIG. 61.
Figure 60:
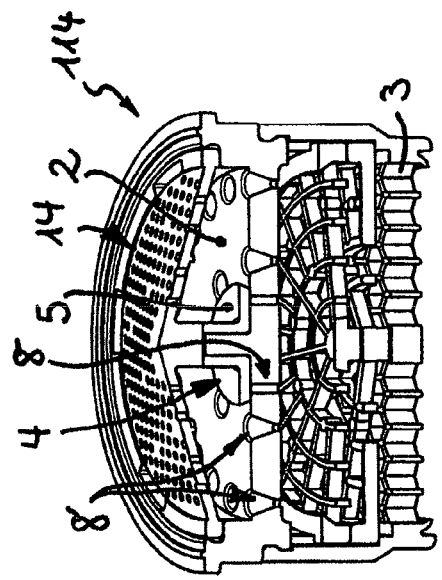
Figure 59:
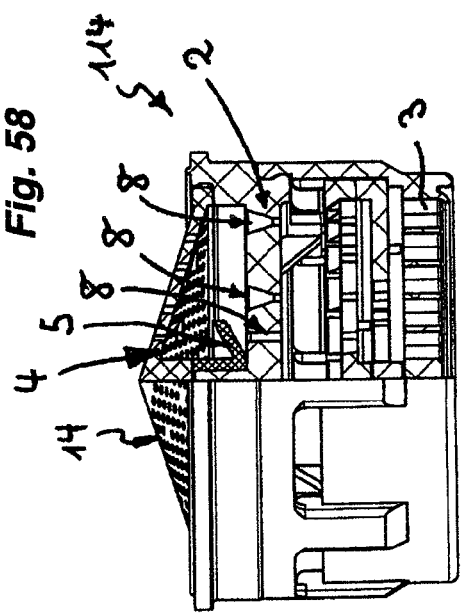
Figure 61:
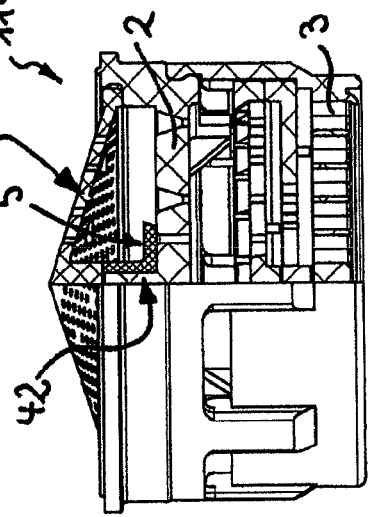

The installation element 113 shown in FIGS. 55 to 57 is also embodied as a jet regulator which can be inserted into the outlet mouthpiece of a sanitary outlet fitting. The jet regulator 113 according to FIGS. 55 to 57 is assigned an admixing device 4 which is arranged at the inflow side and which has a throttling or closing element 5. From a comparison of the open position shown in FIG. 55 on the one hand and the closed position illustrated in FIG. 56 on the other hand, it is clear that the throttling or closing element 5 can be moved, under the pressure of the inflowing water, from an admixing or open position into a throttling or closed position, in which the admixing device 4 provides only a reduced clear throughflow cross section in relation to the open position, counter to a restoring force. Here, the admixing device 4 is arranged upstream of the jet splitter 2, which is embodied here as a diffuser, at the inflow side, in such a way that the throttling or closing element 5, in its closed position, closes off a partial region of the jet splitter inflow which flows to the jet splitter 2.

In the exploded illustration of its constituent parts in FIG. 57, it can be seen that the installation element 113 has a throttling or closing element 5 which is produced from elastic material and which can be deformed, under the pressure of the inflowing water flow, counter to the inherent elasticity of the throttling element material in such a way that the throttling or closing element which is deformed in its throttling or closed position covers a partial region of the jet splitter inlet. For this purpose, the throttling or closing element is formed in the manner of a shield with four shield arms 35 which project at right angles to one another, wherein the throttling or closing element 5 covers, with its segments which are embodied as shield arms 35, in each case one of the in this case eight inflow openings 36, which serve as the jet splitter inlet, in the throttling or closed position. Said inflow openings 36 are provided on a throttle plate 37, which covers the throughflow cross section of the installation element 113, of the admixing device 4, on which throttle plate 37 the throttling or closing element 5 is held by means of a connecting pin 39 which is integrally formed on the jet splitter 2 and which extends through a central plug-through opening 38 of the throttle plate 37. To ensure correct positioning of the throttling or closing element 5 in relation to the inflow openings 36, the connecting opening 40 in the throttling or closing element 5 and the plug-through opening 38 in the throttle plate 37 on the one hand and the connecting pin 39 which is integrally formed on the jet splitter 2 in a unipartite fashion have a complementary non-circular cross section.

The installation element 113 shown in FIGS. 55 to 57 is similar to the jet regulators which have already been illustrated in FIGS. 1 to 4 and 30 to 39.

FIGS. 58 to 61 show an installation element 114 in perspective longitudinal sections (FIGS. 58, 60) and in partially sectioned side views (FIGS. 59, 61), which installation element 114 is likewise embodied as a jet regulator which can be inserted into the outlet mouthpiece of a sanitary outlet fitting. The jet regulator 114, which is embodied as an installation element, has an admixing device 4 with at least one throttling or closing element 5, which throttling or closing element 5 can be moved, under the pressure of the inflowing water, from an open position shown in FIGS. 58 and 59 into the closed position illustrated in FIGS. 60 and 61 counter to a restoring force. While the admixing device 4 opens up a relatively large clear throughflow cross section in the open position of its throttling or closing element 5 shown in FIGS. 58 and 59, a reduced clear throughflow cross section in relation thereto is provided in the throttling or closed position shown in FIGS. 60 and 61.

The jet regulator 114 according FIGS. 58 to 61 has a jet splitter 2 which is embodied here as a perforated plate and which has a multiplicity of throughflow holes 8 arranged in concentric rings. The inflowing water jet is divided into a multiplicity of individual jets in said perforated plate 2. The throttling or closing element 5 which is produced from elastic material can be deformed, under the pressure of the inflowing water flow, counter to the inherent elasticity of the throttling element material, in such a way that the throttling or closing element 5 which is deformed in the throttling or closed position covers at least an inner circle of throughflow holes 8 and reduces the inlet of the inflowing water flow to at least one outer circle of throughflow holes 8 and therefore to the remaining partial region of the jet splitter inlet.

The throttling or closing element 5 is of shield-like design. Said throttling or closing element 5 engages around a central fastening pin 42, which projects above the perforated plate 2, and is braced between the perforated plate 2 and an inflow-side ancillary sieve 14. While the outer peripheral edge region of the throttling or closing element 5 has a funnel shape in the open position, said outer peripheral edge region is deformed into a shield shape, bearing against the jet splitter 2, in the closed position. The mushroom-shaped or shield-like throttling or closing element 5, which is produced from elastic material, of the jet regulator 114 shown in FIGS. 58 to 61 therefore deforms under the pressure of the incoming water, in such a way that some of the throughflow holes 8 which are provided in the perforated plate 2 are closed off, before returning to the open position again, on account of the inherent elasticity of the elastic material, in the event of falling water pressure. The embodiment illustrated in FIGS. 58 to 61 is similar to the jet regulator which was shown in FIGS. 1 to 4.

The invention claimed is:

1. A sanitary installation element which is arranged in a water line that is embodied as a jet regulator, comprising a jet splitter (2) which divides the inflowing water flow into a multiplicity of individual jets, and having an admixing device (4), which comprises at least one bypass duct (12) with a duct opening (13) that is provided upstream of the jet splitter (2) in a flow direction, with at least one throttling or closing element (5, 5'), the at least one throttling or closing element (5, 5') can move, under the pressure of the inflowing water, from an admixing or open position into a throttling or closed position counter to a restoring force, with the admixing device (4), in the admixing or open position of the at least one throttling or closing element (5, 5'), providing a clear throughflow cross section, and in the throttling or closed position of the at least one throttling or closing element (5, 5'), providing a reduced clear throughflow cross section in relation thereto, the admixing device (4) is provided upstream of the jet splitter (2) at an inflow side, and the at least one throttling or closing element (5, 5'), in its throttling or closed position, closes off at least one of: a partial region of the jet splitter inlet, a partial region of a clear passage cross section of the jet splitter (2), or the at least one bypass duct (12) which bypasses at least the jet splitter (2) of the jet regulator, wherein the at least one throttling or closing element (5, 5') has at least one throttling opening which has a clear throttle opening cross section which is reduced in relation to a corresponding one of the partial region of the jet splitter inlet or the partial region of the clear passage cross section of the jet splitter (2), which is covered by the throttling or closing element (5, 5') in the throttling or closed position, of the clear passage cross section of the jet splitter or in relation to the duct opening.

2. The installation element as claimed in claim 1, wherein the at least one throttling or closing element (5, 5'), in the throttling or closed position, covers a partial region of the clear passage cross section of the jet splitter (2), or an edge region which borders the duct opening (13), at an inflow side.

3. The installation element as claimed in claim 1, wherein the installation element further comprises at least one functional unit which follows the jet splitter (2) in a flow direction and which serves for jet preparation.

4. The installation element as claimed in claim 1, wherein the at least one throttling or closing element (5, 5') can be deformed from a funnel shape in which a periphery thereof extends toward an upstream direction, provided in the admixing or open position, into a shield shape, in which the periphery bears against the jet splitter (2), in the throttling or closed position.

5. The installation element as claimed in claim 1, wherein the at least one throttling or closing element (5, 5') is movable in an axial direction between an admixing or open position, which is spaced apart from the jet splitter, and the throttling or closed position.

6. A sanitary installation element which is arranged in a water line that is embodied as a jet regulator, comprising a jet splitter (2) which divides the inflowing water flow into a multiplicity of individual jets, and having an admixing device (4) with at least one throttling or closing element (5, 5'), the at least one throttling or closing element (5, 5') can move, under the pressure of the inflowing water, from an admixing or open position into a throttling or closed position counter to a restoring force, with the admixing device (4), in the admixing or open position of the at least one throttling or closing element (5, 5'), providing a clear throughflow cross section, and in the throttling or closed position of the at least one throttling or closing element (5, 5'), providing a reduced clear throughflow cross section in relation thereto, the admixing device (4) is provided upstream of the jet splitter (2) at an inflow side, and the at least one throttling or closing element (5, 5'), in its throttling or closed position, closes off at least one bypass duct (12) which bypasses at least the jet splitter (2) of the jet regulator, a funnel-shaped ancillary or filter sieve (14) is positioned upstream of the jet regulator in a flow direction, and a funnel opening of the funnel-shaped ancillary or filter sieve (14), which is at a downstream side of the ancillary or filter sieve, is embodied as a duct opening (13) of the at least one bypass duct (12) of the admixing device (4) provided upstream of the jet splitter (2), and said duct opening (13) has a clear opening cross section which is larger in relation to filter openings of the ancillary or filter sieve (14).

7. The installation element as claimed in claim 6, wherein the duct outlet of the at least one bypass duct (12) is provided in the flow direction upstream of at least one functional unit, which is positioned in the flow direction downstream of the jet splitter (2).

8. A sanitary installation element which is arranged in a water line that is embodied as a jet regulator, comprising a jet splitter (2) which divides the inflowing water flow into a multiplicity of individual jets, and having an admixing device (4) with at least one throttling or closing element (5, 5'), the at least one throttling or closing element (5, 5') includes a fixed anchor portion connected to a center portion of the jet splitter and an elastically deformable closing portion extending therefrom that moves through flexing under the pressure of the inflowing water, from an admixing or open position into a throttling or closed position counter to a restoring force provided by the elastic deformation, with the admixing device (4), in the admixing or open position of the at least one throttling or closing element (5, 5'), providing a clear throughflow cross section, and in the throttling or closed position of the at least one throttling or closing element (5, 5'), providing a reduced clear throughflow cross section in relation thereto, the admixing device (4) is provided upstream of the jet splitter (2) at an inflow side, and the at least one throttling or closing element (5, 5'), in its throttling or closed position, closes off at least one of: a partial region of the clear passage cross section of the jet splitter (2), or at least one bypass duct (12) which bypasses at least the jet splitter (2) of the jet regulator, with the bypass duct including a duct opening (13) that is provided upstream of the jet splitter (2) in a flow direction, wherein the admixing device (4) has at least two of the throttling elements (5, 5') or the at least one throttling element (5) has at least two throttling element partial regions which can be moved from the admixing or open position into the throttling or closed position at different water pressures.

9. A sanitary installation element which is arranged in a water line that is embodied as a jet regulator, comprising a jet splitter (2) which divides the inflowing water flow into a multiplicity of individual jets, and having an admixing device (4) with at least one throttling or closing element (5, 5'), the at least one throttling or closing element (5, 5') can move, under the pressure of the inflowing water, from an admixing or open position into a throttling or closed position counter to a restoring force, with the admixing device (4), in the admixing or open position of the at least one throttling or closing element (5, 5'), providing a clear throughflow cross section, and in the throttling or closed position of the at least one throttling or closing element (5, 5'), providing a reduced clear throughflow cross section in relation thereto, the admixing device (4) is provided upstream of the jet splitter (2) at an inflow side, and the at least one throttling or closing element (5, 5'), in its throttling or closed position, closes off at least one of: a partial region of the jet splitter inlet, a partial region of the clear passage cross section of the jet splitter (2), or at least one bypass duct (12) which bypasses at least the jet splitter (2) of the jet regulator, and the at least one throttling or closing element (5, 5') is provided upstream of the jet splitter (2) at an inflow side, the jet splitter (2) comprises a jet splitter plate with a plurality of openings, and the at least one throttling or closing element (5, 5') can be moved, at least with at least one partial region under pressure of the inflowing water flow, from the admixing or open position, which is spaced apart from the inflow side of the jet splitter (2), into the throttling or closed position counter to a restoring force, in the throttling or closed position the at least one throttling or closing element (5, 5') completely closes off some of the plurality of openings in the jet splitter plate.

10. The installation element as claimed in claim 9, wherein the jet splitter (2) is a diffuser.

11. The installation element as claimed in claim 9, wherein the at least one throttling or closing element is produced from elastic material and can be elastically deformed through flexing of a portion thereof, under the pressure of the inflowing water flow against an inherent elasticity of the throttling element material, in such a way that the throttling or closing element (5, 5') which is deformed in the throttling or closed position covers at least some of the plurality of openings in the jet splitter plate.

12. The installation element as claimed in claim 11, wherein the at least one throttling or closing element (5, 5') has a shield-like design and, in at least one of the throttling or closed position, at least a segment of the shield or shield edge region, covers at least some of the plurality of openings in the jet splitter.

13. The installation element as claimed in claim 12, wherein the shield of the shield-like throttling or closing element (5, 5') is divided in a circumferential direction into shield segments which are deformable separately from one another, and the shield segments of the throttling or closing element (5, 5') are deformable in different pressure ranges.

14. The installation element as claimed in claim 11, wherein the at least one throttling or closing element (5, 5') is held on the jet splitter (2) at the inflow side.

\* \* \* \* \*